Patented June 21, 1932

1,863,676

UNITED STATES PATENT OFFICE

EDMOND T. TISZA, OF NEW YORK, AND BERNARD JOOS, OF YONKERS, NEW YORK, ASSIGNORS TO THE PYRIDIUM CORPORATION, OF NEPERA PARK, NEW YORK, A CORPORATION OF NEW YORK

AMINO-HYDROXY PYRIDINE AND PROCESS OF PREPARING THE SAME

No Drawing.      Application filed July 11, 1929. Serial No. 377,599.

This invention is an improvement in a method of preparing amino-hydroxy-pyridine-derivatives, such as alpha-hydroxy-alpha-amino-pyridine.

An object of the invention is the provision of a new and improved method of preparing the substance in question, through substitution of a hydroxyl group for one amino group in alpha-alpha-diamino-pyridine.

The alpha-hydroxy-alpha-amino-pyridine is obtained in a manner relatively simple, by boiling alpha-alpha-diamino-pyridine with dilute hydrochloric acid for a selected length of time. During the boiling, an amino group is split off, and replaced by a hydroxy group. The improved method is a very important technical improvement or methods hitherto known.

The procedure is as follows:

Example 1

18 grams alpha-alpha-diamino-pyridine are dissolved in 425 cc. hydrochloric acid of 10% and boiled for three hours on a reflux condenser. The solution is then evaporated to a small volume and cooled down to crystallize. The mother liquor gives off ammonia on addition of sodium hydroxide. The product is purified by dissolving in a small quantity of water and precipitated with concentrated hydrochloric acid. This hydrochloride can be converted into the free base by dissolving it in small quantities of water at about 40° C. and adding 40% sodium hydroxide solution until it is just slightly alkaline, when the free base begins to crystallize out. The free base can be recrystallized out of acetone. Yield is about 85% of theory. Its melting point is about 207°.

The aqueous solution of the base gives a violet color with ferric chloride. It is very soluble in water, dilute acids, dilute alkalies, or methyl alcohol, and insoluble in chloroform, ether or toluol. It crystallizes out of acetone in large colorless prisms.

The chemical reaction of the process is the following:

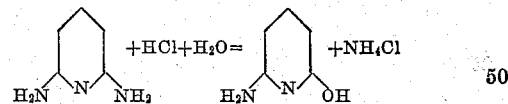

Instead of hydrochloric acid, other mineral acids (sulphuric etc.) may be used for the reaction.

The amino group can be replaced with a hydroxyl group in substituted alpha-alpha-diamino-pyridines the same way.

What is claimed as new is:—

1. The method of preparing alpha-hydroxy-alpha-amino-pyridine which consists in substituting a hydroxyl group for one amino group in alpha-alpha-diamino-pyridine by treatment with a mineral acid of proper strength.

2. The method of preparing alpha-hydroxy-alpha-amino-pyridine, which consists in boiling alpha-alpha-diamino-pyridine with 10% (by weight) hydrochloric acid.

3. The method of preparing alpha-hydroxy-alpha-amino-pyridine, which consists in boiling alpha-alpha-diamino-pyridine with a dilute mineral acid.

4. The method of preparing alpha-hydroxy-alpha-amino-pyridine, which consists in boiling alpha-alpha-diamino-pyridine with 10% (by weight) hydrochloric acid and purifying by crystallization.

5. The method of preparing alpha-hydroxy-alpha-amino-pyridine, which consists in boiling alpha-alpha-diamino-pyridine with a dilute mineral acid and purifying by crystallization.

6. The method of preparing alpha-hydroxy-alpha-amino-pyridine, which consists in splitting off an amino group in alpha-alpha-diamino-pyridine and replacing it with a hydroxy group by boiling with a dilute mineral acid.

7. The method of preparing alpha-hydroxy-alpha-amino-pyridine, which consists in splitting off an amino group in alpha-alpha-diamino-pyridine and replacing it with a hydroxy group by boiling with 10% (by weight) hydrochloric acid.

8. The method of preparing alpha-hydroxy-alpha-amino-pyridine, which consists in boiling alpha-alpha-diamino-pyridine with dilute hydrochloric acid.

9. The method of preparing amino hydroxy-pyridine which comprises preparing an acidified solution of diamino-pyridine and then boiling.

Signed at Yonkers, in the county of Westchester and State of New York this 9th day of July A. D. 1929.

Dr. BERNARD JOOS.
EDMOND T. TISZA.